UNITED STATES PATENT OFFICE.

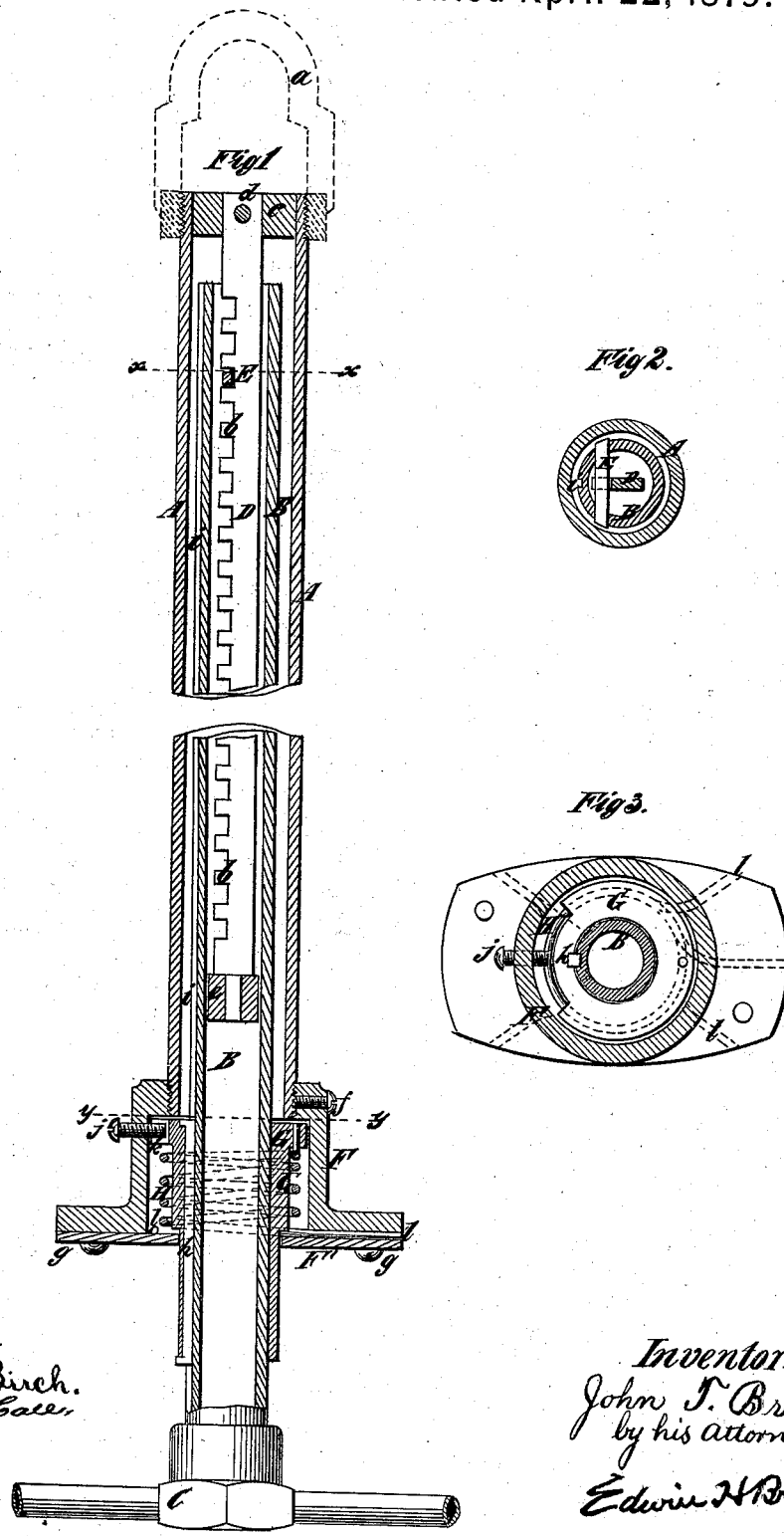

JOHN T. BRUEN, OF BROOKLYN, NEW YORK.

IMPROVEMENT IN EXTENSION-CHANDELIERS.

Specification forming part of Letters Patent No. 214,618, dated April 22, 1879; application filed February 8, 1879.

*To all whom it may concern:*

Be it known that I, JOHN T. BRUEN, of Brooklyn, in Kings county, and State of New York, have invented certain new and useful Improvements in Extension or Drop Lights, of which the following is a specification.

The object of this invention is to produce a simple, cheap, and durable extension or drop light for illuminating devices, such as candles or lamps, capable of being conveniently raised or lowered into different positions convenient for use.

To this end the invention consists in the combination of a stationary or non-extensible tube, a stationary rack or indented bar, and an extensible tube provided with a catch capable of being engaged with or released from said rack or indented bar at different positions by being oscillated or turned relatively thereto, whereby the desired result is obtained.

It also consists in the combination, with the above, of a spring for turning the said extensible tube into position for the catch to engage with the rack or indented bar when not otherwise actuated; also, in the combination, with the above, of a guide and a stop or buffer on the rack, and in details of construction to be hereinafter explained.

In the accompanying drawings, Figure 1 is a vertical section of an extension or drop light embodying my invention. Fig. 2 is a horizontal section of the same at the dotted line $x\ x$, Fig. 1; and Fig. 3 is a horizontal section of the same at the dotted line $y\ y$, Fig. 1.

Similar letters of reference designate corresponding parts in all the figures.

A designates a stationary or non-extensible tube, which may be screwed into a pipe or nipple, or may be provided with a loop or shackle, $a$, and hung from a hook or other suitable device. B designates an extensible or drop-light tube within the tube A, and adapted to be adjusted or extended vertically relatively thereto. It carries a "harp," C, or other device, for sustaining an extensible illuminating device. D designates a rack or indented bar, (shown as flat in form,) and provided with teeth $b$ or notches in one of its inner sides or edges, and securely fixed centrally within the non-extensible tube A. E designates a catch arranged in its extensible or drop tube B. (Shown as consisting of a bar extending transversely across the inside of the said tube B, at one side of the center thereof.) By turning the tube B in one direction this catch is caused to engage with the teeth of the rack or indented bar D, and the tube and extension or drop light are supported thereby; and by turning the tube so as to bring the catch toward one of the flat sides of the rack or indented bar it will be disengaged from the teeth of the same, and the extensible or drop tube can be adjusted upward or downward relatively to the non-extensible tube at pleasure.

It is obvious that the teeth or indentations of the rack or bar D may be of various shapes, and that said rack or bar may be provided with teeth or indentations on both its narrow sides or edges; also, that two catches may be combined with either or both sides of the rack or indented bar.

It will be readily understood that the rack or indented bar may be oval or semi-cylindrical instead of flat, so long as provision is afforded for turning the catch or catches, for the purpose of effecting the engagement and release of the same with and from the teeth of said rack or indented bar.

The rack or indented bar is shown as inserted into a head, $c$, at the upper end of the non-extensible tube A, and as being secured in place by a cross-pin, $d$, passing through it. Preferably it has at or near its lower end a cylinder, $e$, of india-rubber, leather, or analogous material, which serves to insure the proper central relations between it and the extensible or drop tube B. This cylinder also constitutes a buffer and stop to preclude the latter from slipping out of the non-extensible tube A by obtruding itself in the way of the catch E.

F designates what I term a "bridge-piece," to which the arms or branches and ornaments of the chandelier may be attached. It is shown as of cylindrical form, and is secured to the lower end of the non-extensible tube A. It may be screwed directly on the same, and precluded from turning by means of a set-screw, $f$. It is shown as having a removable bottom plate, F', secured to a flange by means of screws $g$.

G designates a collar or barrel, fitting within the bridge-piece F, and surrounding the extensible or drop tube B. It is locked to turn with the latter by means of a gib-feather, $h$, fitting in a groove in it, and a groove, $i$, in the tube; but said tube is susceptible of longitudinal adjustment independently of it, because the groove $i$ is free to slide over the gib or feather $h$. The oscillation or turning of this collar, and hence of the extensible tube, is limited and insured being in the proper direction by means of a projection or screw, $j$, on the box fitting into a recess, $k$, in the flanges of the collar. A spring, H, (shown as of spiral form,) is shown as arranged around the collar G within the box F. One end is inserted in a hole in the flange of the collar G, and the other clamped in one of a series of recesses, $l$, between the bottom flange of the box and its bottom plate, F'; hence the spring serves to turn the extensible tube into position for its catch E to engage with the rack or indented bar, in order to sustain the said tube and its appurtenances. This tube may be adjusted vertically into different positions by oscillating or turning it against the resistance of the spring sufficiently to disengage the catch E from the rack or indented bar D, whereupon it may be raised or lowered at pleasure. On being released the spring will oscillate or turn it, so as to cause the re-engagement of the catch with the rack or indented bar.

The tension of the spring may be varied by inserting the end in different recesses $l$ in the flange of the bridge-piece F.

It will be seen that by my invention I produce an extensible drop-light having few parts, all simple in construction, and one capable of sustaining any desired weight and susceptible of convenient adjustment.

It is obvious that my invention suitably modified is susceptible of embodiment in extensible or drop lights for illuminating-gas.

What I claim as my invention, and desire to secure by Letters Patent, is—

1. The combination of a stationary or non-extensible tube, a stationary rack or indented bar, an extensible tube provided with a catch, and capable of being oscillated or turned to cause the engagement or disengagement of its catch with or from the rack or indented bar, substantially as specified.

2. The combination, with a stationary or non-extensible tube, a stationary rack or indented bar, an extensible tube provided with a catch, and capable of being oscillated or turned to effect the engagement or disengagement of its catch with or from said rack or indented bar, of a spring for oscillating or turning the extensible tube, so as to effect the engagement of its catch with said rack or indented bar, substantially as specified.

3. The combination, with a stationary or non-extensible tube, a stationary rack or indented bar, an extensible tube provided with a catch, and capable of being oscillated or turned, of a buffer or stop on said rack or indented bar, substantially as specified.

4. The combination, with a stationary or non-extensible tube, a stationary rack or indented bar, an extensible tube provided with a catch, and capable of being oscillated or turned to effect the engagement or disengagement of said catch with or from said rack or indented bar, of a collar to turn with but not to otherwise interfere with the movement of said extensible tube, and a spring connected to said collar and to the stationary or non-extensible tube, substantially as specified.

5. The combination of the tubes A and B, rack or indented bar D, catch E, box F and bottom plate, F', collar G, spring H, recess $k$, and projection or screw $j$, substantially as and for the purpose specified.

JOHN T. BRUEN.

Witnesses:
CHANDLER HALL,
THOS. E. BIRCH.